(12) United States Patent
Yu et al.

(10) Patent No.: US 10,797,599 B2
(45) Date of Patent: Oct. 6, 2020

(54) METHOD FOR REGULATING OUTPUT CHARACTERISTICS OF PHOTOVOLTAIC MODULE AND DIRECT CURRENT/DIRECT CURRENT CONVERTER

(71) Applicant: SUNGROW POWER SUPPLY CO., LTD., Hefei (CN)

(72) Inventors: Yanfei Yu, Hefei (CN); Hua Ni, Hefei (CN); Zongjun Yang, Hefei (CN); Jingjing Xie, Hefei (CN)

(73) Assignee: SUNGROW POWER SUPPLY CO., LTD., Anhui, Hefei (CN)

( * ) Notice: Subject to any disclaimer, the term of this patent is extended or adjusted under 35 U.S.C. 154(b) by 200 days.

(21) Appl. No.: 16/048,924

(22) Filed: Jul. 30, 2018

(65) Prior Publication Data

US 2019/0074768 A1 Mar. 7, 2019

(30) Foreign Application Priority Data

Sep. 6, 2017 (CN) .......................... 2017 1 0796575

(51) Int. Cl.
*H02M 3/158* (2006.01)
*H02S 40/30* (2014.01)
(Continued)

(52) U.S. Cl.
CPC .......... *H02M 3/1582* (2013.01); *H02J 3/383* (2013.01); *H02M 1/36* (2013.01); *H02M 3/156* (2013.01);
(Continued)

(58) Field of Classification Search
CPC ....... H02M 3/1582; H02M 2001/0012; H02M 1/36; H02M 3/156; H02J 3/383; H02S 40/30
See application file for complete search history.

(56) References Cited

U.S. PATENT DOCUMENTS 10,348,095 B2* 7/2019 Kahn .................. H02J 1/102
2010/0156192 A1* 6/2010 Wang .................. H02J 3/01
307/82

(Continued)

FOREIGN PATENT DOCUMENTS

CN 105553391 A 5/2016
CN 105827179 A 8/2016
(Continued)

OTHER PUBLICATIONS

Extended European Search Report regarding European Application No. 18184540 dated Feb. 11, 2019.
(Continued)

*Primary Examiner* — Jared Fureman
*Assistant Examiner* — Duc M Pham
(74) *Attorney, Agent, or Firm* — Harness, Dickey & Pierce, P.L.C.

(57) ABSTRACT

A method for regulating output characteristics of a photovoltaic module and a DC/DC converter are provided. The DC/DC converter connected with the photovoltaic module determines whether an output voltage of the DC/DC converter detected in a real-time manner is greater than a first preset voltage threshold, and controls an output current of the DC/DC converter to be greater than a first preset current threshold and less than zero or control an output power of the DC/DC converter to be greater than a first preset power threshold and less than zero, in a case that the output voltage is greater than a first preset voltage threshold.

14 Claims, 10 Drawing Sheets

(51) Int. Cl.
 *H02M 1/36* (2007.01)
 *H02M 3/156* (2006.01)
 *H02J 3/38* (2006.01)
 *H02M 1/00* (2006.01)

(52) U.S. Cl.
 CPC ..... *H02S 40/30* (2014.12); *H02M 2001/0012* (2013.01)

(56) References Cited

U.S. PATENT DOCUMENTS

| | | | |
|---|---|---|---|
| 2010/0327659 A1* | 12/2010 | Lisi | H01L 31/02021 307/82 |
| 2013/0328403 A1 | 12/2013 | Kaufman et al. | |
| 2017/0018931 A1* | 1/2017 | Kahn | H02J 3/383 |
| 2017/0222440 A1 | 8/2017 | Shi et al. | |
| 2018/0287389 A1 | 10/2018 | Yu et al. | |

FOREIGN PATENT DOCUMENTS

| | | |
|---|---|---|
| CN | 105896601 A | 8/2016 |
| CN | 106684924 A | 5/2017 |
| EP | 3089339 A2 | 11/2016 |
| JP | 2003339116 A | 11/2003 |
| JP | 2014128164 A | 7/2014 |
| WO | WO-2017011547 A1 | 1/2017 |

OTHER PUBLICATIONS

First Chinese Office Action regartding Application No. 201710796575.2 dated Feb. 3, 2020. English translation provided by Unitalen Attorneys at Law.

European Office Action regarding Application No. 18184540.5 dated Apr. 24, 2020.

\* cited by examiner

METHOD FOR REGULATING OUTPUT CHARACTERISTICS OF PHOTOVOLTAIC MODULE AND DIRECT CURRENT/DIRECT CURRENT CONVERTER The present application claims priority to Chinese Patent Application No. 201710796575.2, titled "METHOD FOR REGULATING OUTPUT CHARACTERISTICS OF PHOTOVOLTAIC MODULE AND DIRECT CURRENT/DIRECT CURRENT CONVERTER", filed on Sep. 6, 2017 with the State Intellectual Property Office of People's Republic of China, which is incorporated herein by reference in its entirety.

FIELD

The present disclosure relates to the technical field of photovoltaic power generation, and particularly to a method for regulating output characteristics of a photovoltaic module and a direct current/direct current (DC/DC) converter.

BACKGROUND

In a photovoltaic power generation system, multiple photovoltaic modules are connected in series to constitute a photovoltaic string having a high DC voltage. Multiple photovoltaic strings are connected in parallel to constitute a photovoltaic array.

FIG. 1 shows an output power-voltage (PV) characteristic curve of the photovoltaic module, and FIG. 2 shows an output current-voltage (IV) characteristic curve of the photovoltaic module. In a case that the photovoltaic module operates normally, an operating point of the photovoltaic module is located in the first quadrant of the IV characteristic graph and the PV characteristic graph, to output a power. In a case that the operating point of the photovoltaic module is located in the second quadrant of the IV characteristic graph, the photovoltaic module operates in a power absorbing state in a case of forward overcurrent. In a case that the operating point of the photovoltaic module is located in the fourth quadrant of the IV characteristic graph, the photovoltaic module operates in a power absorbing state in a case of forward overvoltage.

In a practical application, open-circuit voltages of the parallel photovoltaic modules are different due to different parameters of the photovoltaic modules, different illumination and different temperatures or the like. The open-circuit voltage difference is large in a standby state of the photovoltaic power generation system, and an output voltage of the photovoltaic module in a part of the photovoltaic strings may be greater than the open-circuit voltage Voc. In this case, the operating point of the photovoltaic module is located in the fourth quadrant, which results in a large reverse current and a large reverse power. Furthermore, a circulating current occurs between the photovoltaic strings in the photovoltaic power generation system, which results in occurrence of a fault such as hotspots and direct-current fuse blowing in the photovoltaic module, and degradation of operation reliability of the photovoltaic power generation system.

SUMMARY

A method for regulating output characteristics of a photovoltaic module and a DC/DC converter are provided in the present disclosure, to solve a problem of low reliability in the conventional technology caused by a large reverse current in a case of forward overvoltage.

The technical solutions of the present disclosure are described below to realize the above objective.

A method for regulating output characteristics of a photovoltaic module is provided. The method is applied to a DC/DC converter connected with the photovoltaic module. The method includes: determining whether an output voltage of the DC/DC converter detected in a real-time manner is greater than a first preset voltage threshold; and controlling an output current of the DC/DC converter to be greater than a first preset current threshold and less than zero or controlling an output power of the DC/DC converter to be greater than a first preset power threshold and less than zero, in a case that the output voltage is greater than the first preset voltage threshold.

In an embodiment, the method further includes: determining whether the output voltage detected in a real-time manner is greater than a second preset voltage threshold, where the second preset voltage threshold is greater than the first preset voltage threshold; and controlling the DC/DC converter to enter a protection mode in a case that the output voltage is greater than the second preset voltage threshold. In the protection mode, the DC/DC converter stops converting power and closes power switches.

In an embodiment, the controlling an output current of the DC/DC converter to be greater than a first preset current threshold and less than zero includes: controlling the output current to change in a range from the first preset current threshold to a first preset current value, according to a first monotone decreasing function with an independent variable of the output voltage, in at least a part of an output voltage interval. The controlling an output power of the DC/DC converter to be greater than a first preset power threshold and less than zero includes: controlling the output power to change in a range from the first preset power threshold to a first preset power value, according to a second monotone decreasing function with an independent variable of the output voltage, in at least a part of an output voltage interval. The first preset current value does not exceed fifty percent of a rated value of the output current, and the first preset power value does not exceed fifty percent of a rated value of the output power.

In an embodiment, the method further includes: determining whether the output voltage detected in a real-time manner is greater than or equal to a third preset voltage threshold and less than or equal to the first preset voltage threshold, where the third preset voltage threshold is less than the first preset voltage threshold; and controlling an absolute value of the output current to be not greater than a second preset current value or controlling an absolute value of the output power to be not greater than a second preset power value, in a case that the output voltage is greater than or equal to the third preset voltage threshold and less than or equal to the first preset voltage threshold.

In an embodiment, the method further includes: determining whether the output voltage detected in a real-time manner is less than a third preset voltage threshold, where the third preset voltage threshold is less than the first preset voltage threshold; and controlling the output current to be greater than zero or controlling the output power to be greater than zero, in a case that the output voltage is less than the third preset voltage threshold.

In an embodiment, the controlling the output current to be greater than zero or the controlling the output power to be greater than zero includes: controlling the DC/DC converter to perform maximum power point tracking on an output of the photovoltaic module connected with the DC/DC converter.

In an embodiment, the controlling the output current to be greater than zero or the controlling the output power to be greater than zero includes: in a case that the output voltage is less than the third preset voltage threshold and greater than a fourth preset voltage threshold, controlling the output current to change in a range from a third preset current value to a second preset current threshold according to a third monotone decreasing function with an independent variable of the output voltage in at least a part of an output voltage interval or controlling the output power to change in a range from a third preset power value to a second preset power threshold according to a fourth monotone decreasing function with an independent variable of the output voltage, in at least a part of an output voltage interval. The fourth preset voltage threshold is less than the third preset voltage threshold, and the third preset current value does not exceed fifty percent of a rated value of the output current, and the third preset power value does not exceed fifty percent of a rated value of the output power.

In an embodiment, the controlling the output current to be greater than zero or the controlling the output power to be greater than zero includes: in a case that the output voltage is less than a fifth preset voltage threshold and greater than zero, controlling the output current to change in a range from a fourth preset current value to a third preset current threshold according to a first monotone increasing function with an independent variable of the output voltage in at least a part of an output voltage interval or controlling the output power to change in a range from a fourth preset power value to a third preset power threshold according to a second monotone increasing function with an independent variable of the output voltage in at least a part of an output voltage interval. The fifth preset voltage threshold is less than the fourth preset voltage threshold.

In an embodiment, the method further includes: controlling the third preset voltage threshold to change in at least one continuous time period according to a third monotone increasing function with an independent variable of time, in a startup phase of the DC/DC converter.

A DC/DC converter is provided, which includes a main circuit and a control unit. An input terminal of the main circuit is connected with at least one photovoltaic module. An output terminal of the main circuit is connected with an output terminal of a main circuit of other DC/DC converter in series. A control terminal of the main circuit is connected with an output terminal of the control unit. The control unit includes a processing module and a storage module. The processing module is configured to execute multiple instructions stored in the storage module to perform the method for regulating output characteristics of the photovoltaic module described above.

In an embodiment, the main circuit is a bidirectional symmetric Buck-boost topology circuit.

In an embodiment, the method for regulating output characteristics of the photovoltaic module is implemented in an output voltage closed-loop control manner, or a double closed-loop control manner including an outer loop of input voltage and an inner loop of current.

In the method for regulating output characteristics of the photovoltaic module in the present disclosure, a DC/DC converter connected with a photovoltaic module determines an output voltage detected in a real-time manner, and in a case that the output voltage is greater than a first preset voltage threshold, controls an output current of the DC/DC converter to be greater than a first preset current threshold and less than zero, or controls an output power of the DC/DC converter to be greater than a first preset power threshold and less than zero. In the method, a reverse current or a reverse power in an output characteristic curve of the DC/DC converter in the fourth quadrant is limited, to avoid a large reverse current from occurring in the photovoltaic string, and avoid the photovoltaic module from generating heat in a case that a large reverse power is absorbed, thereby effectively improving operation reliability of the photovoltaic power generation system.

BRIEF DESCRIPTION OF THE DRAWINGS

In order to illustrate the technical solutions according to the embodiments of the present disclosure or in the conventional technology more clearly, the drawings required in description of the embodiments or the conventional technology are introduced simply below. Apparently, the drawings in the following description show only some embodiments of the present disclosure, and other drawings may be obtained by those skilled in the art based on the provided drawings without creative work.

DETAILED DESCRIPTION OF THE EMBODIMENTS

The technical solutions according to the embodiments of the present disclosure will be described clearly and completely below in conjunction with the drawings in the embodiments of the present disclosure. It is apparent that the described embodiments are only a part rather than all of the embodiments of the present disclosure. Any other embodiments obtained by those skilled in the art without creative work based on the embodiments of the present disclosure fall within the protection scope of the present disclosure.

A method for regulating output characteristics of a photovoltaic module is provided in the present disclosure, to solve a problem of low reliability of a photovoltaic power generation system in the conventional technology caused by a large reverse current in a case of forward overvoltage.

Figure 3:
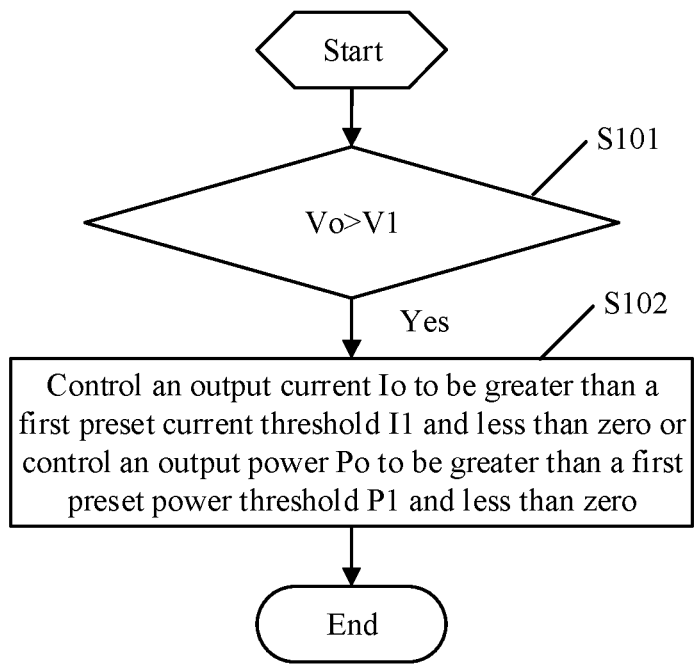
FIG. 3 is a flow diagram of a method for regulating output characteristics of a photovoltaic module according to an embodiment of the present disclosure.

The method for regulating output characteristics of the photovoltaic module is applied to a DC/DC converter connected with the photovoltaic module. As shown in FIG. 3, the method for regulating output characteristics of the photovoltaic module includes steps S101 to S102.

In step S101, it is determined whether an output voltage Vo of the DC/DC converter detected in a real-time manner is greater than a first preset voltage threshold V1.

Step S102 is performed in a case that the output voltage Vo is greater than the first preset voltage threshold V1.

In step S102, an output current Io of the DC/DC converter is controlled to be greater than a first preset current threshold I1 and less than zero, or an output power Po of the DC/DC converter is controlled to be greater than a first preset power threshold P1 and less than zero.

In a case that the output current Io of the DC/DC converter is controlled to be less than zero, or the output power Po of the DC/DC converter is controlled to be less than zero, the DC/DC converter operates in a reverse power absorbing state in the fourth quadrant. Also, the output current Io is controlled to be not less than the first preset current threshold I1, or the output power Po is controlled to be not less than the first preset power threshold P1. Each of the first preset current threshold I1 and the first preset power threshold P1 is a negative value.

Figure 1:
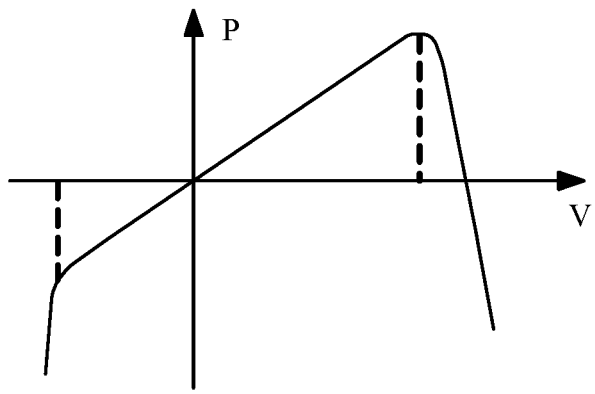
FIG. 1 shows an output PV characteristic curve of a photovoltaic module in the conventional technology.
Figure 2:
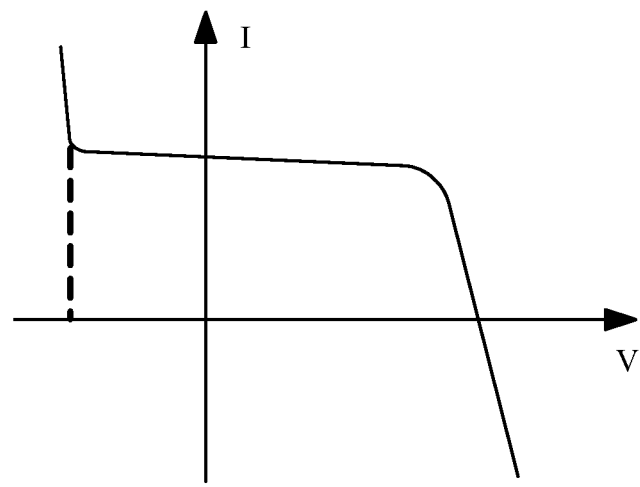
FIG. 2 shows an output IV characteristic curve of a photovoltaic module in the conventional technology.
Figure 4:
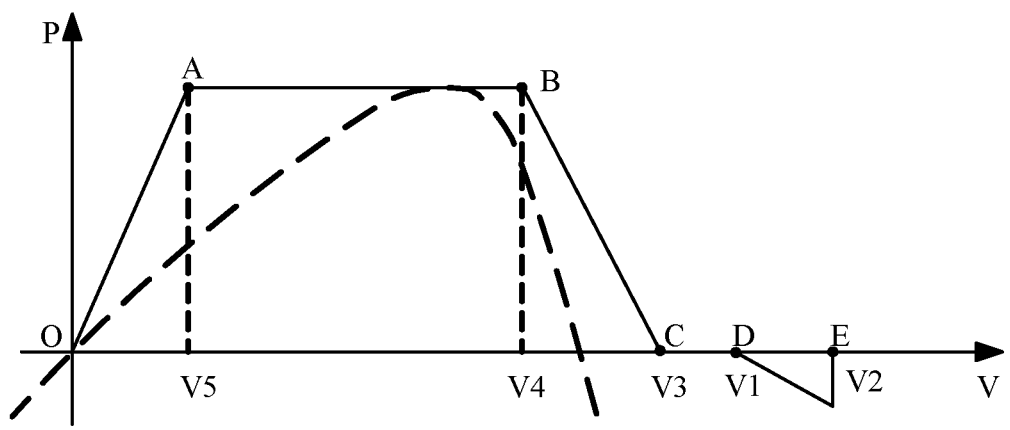
FIG. 4 shows an output PV characteristic curve of a DC/DC converter according to an embodiment of the present disclosure.

In step S102, a Vo>V1 part in the output PV characteristic curve of the photovoltaic module shown in FIG. 1 is converted to a Vo>V1 part in the output PV characteristic curve of the DC/DC converter shown in FIG. 4, to fulfill that the output current Io is limited between the first preset current threshold I1 and zero, or the output power Po is limited between the first preset power threshold P1 and zero, in a practical application. FIG. 4 shows a limitation manner for the output power Po, however, the present disclosure is not limited thereto. The limitation manner may depend on an application situation, and falls within the protection scope of the present disclosure.

In the method for regulating output characteristics of the photovoltaic module according to the embodiment, a reverse current or a reverse power in the output characteristic curve of the DC/DC converter in the fourth quadrant is limited, to avoid a large reverse current from occurring in the photovoltaic string, and also avoid the photovoltaic module from generating heat in a case that a large reverse power is absorbed, thereby effectively improving operation reliability of the photovoltaic power generation system.

Figure 9:
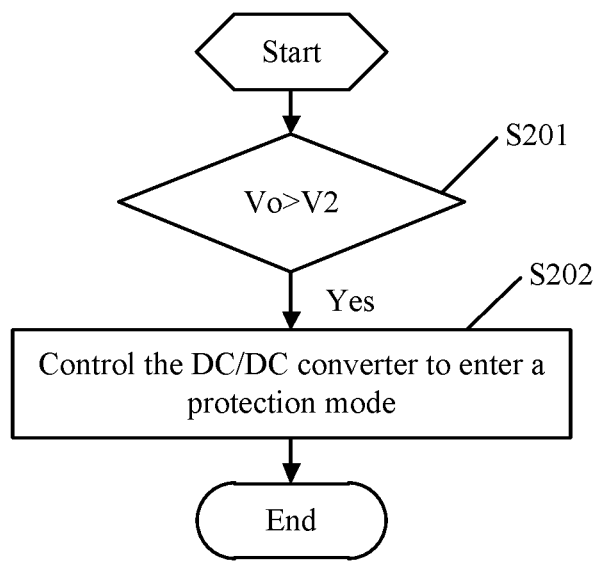
FIG. 9 is a flow diagram of a method for regulating output characteristics of a photovoltaic module according to another embodiment of the present disclosure.

Another method for regulating output characteristics of a photovoltaic module is further provided according to another embodiment of the present disclosure. Based on the above embodiment and FIG. 3, the method further includes steps S201 and S202 shown in FIG. 9.

In step S201, it is determined whether the output voltage Vo detected in a real-time manner is greater than a second preset voltage threshold V2.

As shown in FIG. 4 to FIG. 8, the second preset voltage threshold V2 is greater than the first preset voltage threshold V1.

Step S202 is performed in a case that the output voltage Vo is greater than the second preset voltage threshold V2.

In step S202, the DC/DC converter is controlled to enter a protection mode.

In a preferred embodiment, in a case that the DC/DC converter operates in a reverse power absorbing state in the fourth quadrant, the output voltage Vo of the DC/DC converter is detected. In a case that the output voltage Vo is greater than a second preset voltage threshold V2, the DC/DC converter is controlled to enter a protection mode. An upper limit of the output voltage of the DC/DC converter in the fourth quadrant is limited, to effectively avoid the DC/DC converter from being damaged due to overvoltage, thereby ensuring operation reliability of the system.

In an embodiment, step S102 of controlling the output current Io of the DC/DC converter to be greater than the first preset current threshold I1 and less than zero in FIG. 3 includes: controlling the output current Io to change in a range from the first preset current threshold I1 to a first preset current value, according to a first monotone decreasing function with an independent variable of the output voltage Vo, in at least a part of an output voltage interval.

Step S102 of controlling the output power Po of the DC/DC converter to be greater than the first preset power threshold P1 and less than zero in FIG. 3 includes: controlling the output power Po to change in a range from the first preset power threshold P1 to a first preset power value, according to a second monotone decreasing function with an independent variable of the output voltage Vo, in at least a part of an output voltage interval.

The first preset current value does not exceed fifty percent of a rated value of the output current, and may be zero. The first preset power value does not exceed fifty percent of a rated value of the output power, and may be zero.

In a preferred embodiment, in a case that the output characteristic curve of the DC/DC converter is located in the fourth quadrant, the first preset current threshold I1 is decreased according to the first monotone decreasing function I1=f1(Vo), or the first preset power threshold P1 is decreased according to the second monotone decreasing function P1=f2(Vo), to increase an upper limit of the reverse absorbed power with an increase of the output voltage Vo.

In this way, in a case that a difference obtained by subtracting the first preset voltage threshold V1 from the output voltage Vo is small, the reverse absorbed power of the DC/DC converter is small to suppress a reverse current. In a case that the difference obtained by subtracting the first preset voltage threshold V1 from the output voltage Vo is large, a reverse absorbed power of the DC/DC converter is large, to avoid an overvoltage problem caused by a rapid increase of the output voltage Vo.

In an embodiment, the first monotone decreasing function I1=f1(Vo) and the second monotone decreasing function P1=f2(Vo) may be a linear function, a convex function, a concave function, a step function or a staircase function. Alternatively, the first monotone decreasing function I1=f1(Vo) and the second monotone decreasing function P1=f2(Vo) may also be a piecewise function, and each piece in the piecewise function may be represented as one of a linear function, a convex function, a concave function, a step function or a staircase function, which is not limited here and may depend on an application situation, and all fall within the protection scope of the present disclosure.

With taking the output PV characteristic curve as an example, the second monotone decreasing function P1=f2(Vo) is a linear function in FIG. 4. As shown by a section DE in FIG. 4, a reverse absorbed power of the DC/DC converter increases linearly with an increase of the output voltage Vo, and the output characteristic curve is smooth. Preferably, P1=f2(Vo)=0 in a case of Vo=V1, to prevent power oscillation when the output voltage Vo of the DC/DC converter changes in vicinity of the first preset voltage threshold V1.

Figure 5:
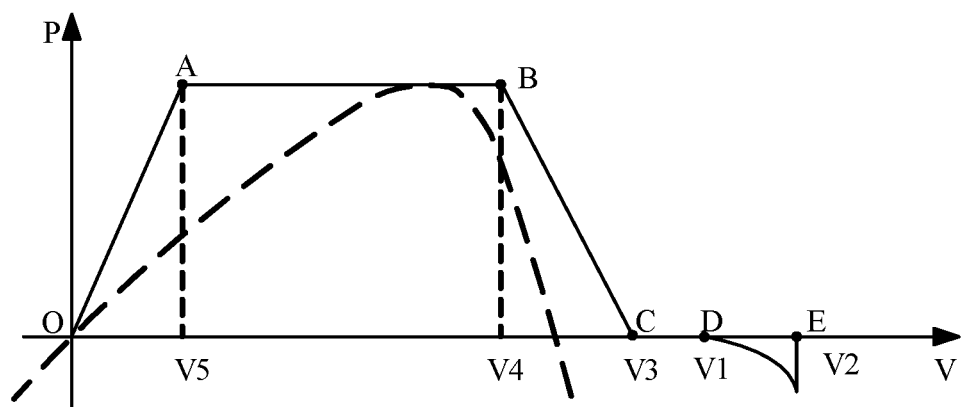
FIG. 5 shows an output PV characteristic curve of a DC/DC converter according to an embodiment of the present disclosure.
Figure 6:
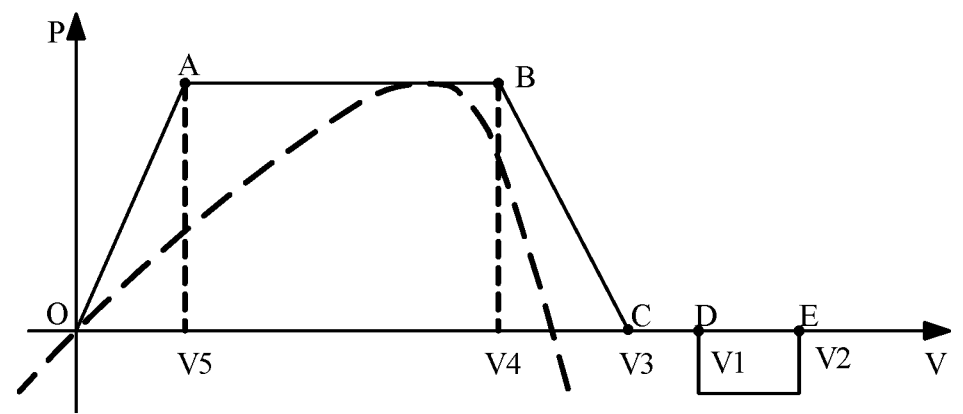
FIG. 6 shows an output PV characteristic curve of a DC/DC converter according to an embodiment of the present disclosure.

The second monotone decreasing function P1=f2(Vo) is a convex function in FIG. 5. As shown by a section DE in FIG. 5, a reverse absorbed power of the DC/DC converter increases rapidly with an increase of the output voltage, and the PV characteristics in this case are similar to characteristics of the photovoltaic module. Preferably, P1=f2(Vo)=0 in a case of Vo=V1, to prevent power oscillation when the output voltage Vo of the DC/DC converter changes in vicinity of the first preset voltage threshold V1.

In order to rapidly control a performance and an effect, the output characteristic curve of the DC/DC converter in the fourth quadrant may be represented as a discontinuous function. The second monotone decreasing function P1=f2(Vo) is a step function in FIG. 6. As shown by a section DE in FIG. 6, the reverse absorbed power remains unchanged in a case that the output voltage of the DC/DC converter is in a range from V1 to V2. In a case that the output voltage of the DC/DC converter exceeds V1, a reverse absorbed power is large to reduce the output voltage Vo rapidly. It should be illustrated that, in a practical application, a time hysteresis loop or an amplitude hysteresis loop may be added to suppress system oscillation which may be caused by a large change of power at a point D. For example, in a case that the output voltage Vo of the DC/DC converter reaches V1 at the point D along a section CD, the reversed absorbed power remains to a fixed value P1 within a time period t, and a reversed absorbed power is determined based on Vo after the time period t. Alternatively, in a case that the output voltage Vo of the DC/DC converter reaches V1 at the point D along the section CD, the reversed absorbed power is set to a fixed value P1, and a reverse absorbed power is not equal to zero until the output voltage Vo is less than a preset voltage V1'. The preset voltage V1' is less than the first preset voltage threshold V1.

Figure 7:
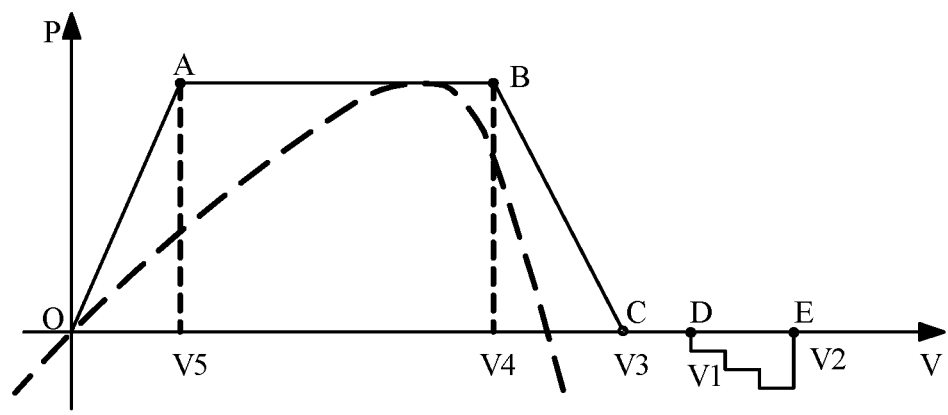
FIG. 7 shows an output PV characteristic curve of a DC/DC converter according to an embodiment of the present disclosure.
Figure 8:
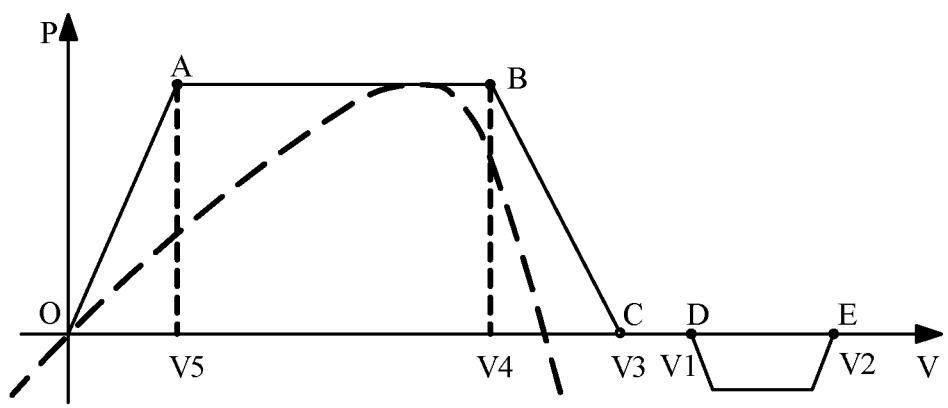
FIG. 8 shows an output PV characteristic curve of a DC/DC converter according to an embodiment of the present disclosure.

As shown in FIG. 7, in order to further reduce pulsation of the reverse absorbed power, the second monotone decreasing function P1=f2(Vo) may be a staircase function. As shown by a section DE in FIG. 7, an output voltage of the DC/DC converter is in a range from V1 to V2, and the output voltage in the range is divided into multiple sections. A reverse absorbed power in each section remains unchanged. The reverse absorbed power increases gradually with an increase of the output voltage Vo among the sections.

In addition, in order to smoothly control output characteristics, the output characteristic curve of the DC/DC converter in the fourth quadrant may not be represented as a monotone function. For example, the output characteristic curve appears a trend of decreasing first and then increasing in FIG. 8. The output characteristic curve changes with limited slopes respectively after the output voltage Vo reaches a critical value at a point D for operating in the fourth quadrant and before the output voltage Vo reaches an upper limit at a point E. Preferably, P1=f2(Vo)=0 in a case of Vo=V1 or Vo=V2, to prevent power oscillation when the output voltage Vo of the DC/DC converter changes in the vicinity of V1 or V2.

The first monotone decreasing function I1=f1(Vo) is set in a similar way as described above, and is not described repeatedly here anymore.

Figure 10:
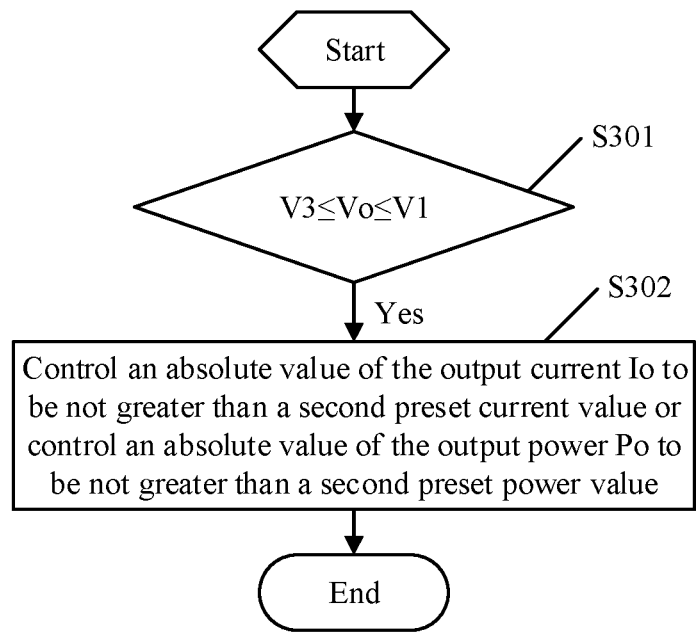
FIG. 10 is a flow diagram of a method for regulating output characteristics of a photovoltaic module according to another embodiment of the present disclosure.

Another method for regulating output characteristics of a photovoltaic module is further provided according to another embodiment of the present disclosure. Based on the above embodiment and FIG. 3, the method further includes steps S301 to S302 shown in FIG. 10.

In step S301, it is determined whether the output voltage Vo detected in a real-time manner is greater than or equal to a third preset voltage threshold V3 and is less than or equal to the first preset voltage threshold V1.

As shown in FIG. 4 to FIG. 8, the third preset voltage threshold V3 is less than the first preset voltage threshold V1.

Step S302 is performed in a case that the output voltage Vo is greater than or equal to the third preset voltage threshold V3 and is less than or equal to the first preset voltage threshold V1.

In step S302, an absolute value of the output current Io is controlled to not exceed a second preset current value, or an absolute value of the output power Po is controlled to not exceed a second preset power value.

In a preferred embodiment, in a case that the output voltage Vo is greater than or equal to V3 and less than or equal to V1, an absolute value of the output power Po or the output current Io of the DC/DC converter is controlled to be in a limited range, to control a circulating current between the photovoltaic modules to be in a small range. In an embodiment, the output power Po or the output current Io of the DC/DC converter may be controlled to be zero, as shown by the section CD in the output characteristic curve shown in FIG. 4 to FIG. 8. In the section CD, no power is inputted or outputted by the DC/DC converter.

Figure 11:
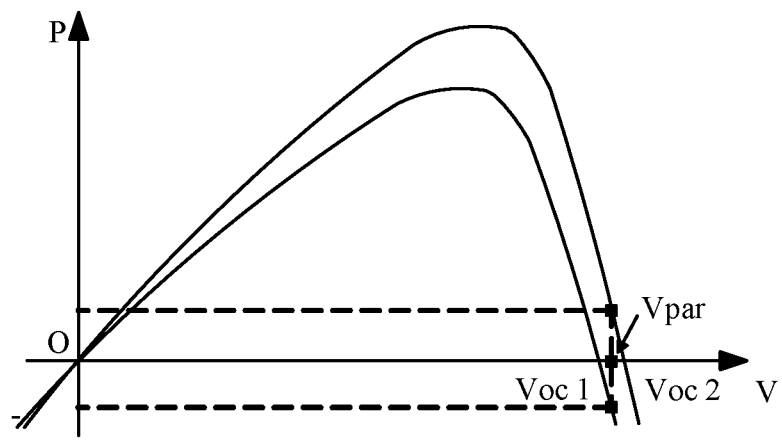
FIG. 11 shows an output PV characteristic curve of a photovoltaic module according to another embodiment of the present disclosure.

Multiple photovoltaic strings are connected in parallel in the conventional photovoltaic power generation system. In a standby mode of the photovoltaic power generation system, in a case that different photovoltaic modules output different voltages, the photovoltaic string having a large output voltage outputs a power to the photovoltaic string having a small output voltage necessarily, to generate a circulating current. As shown in FIG. 11, with taking a case that the two photovoltaic modules are connected in parallel as an example, the two photovoltaic modules have different open-circuit voltages, and a terminal voltage Vpar of the parallel photovoltaic modules is between the two open-circuit voltages Voc1 and Voc2. The photovoltaic module having a large open-circuit voltage operates in a power outputting state in the first quadrant, and the photovoltaic module having a small open-circuit voltage operates in a power absorbing state in the fourth quadrant, which results in a circulating current between the two photovoltaic modules.

Figure 12:
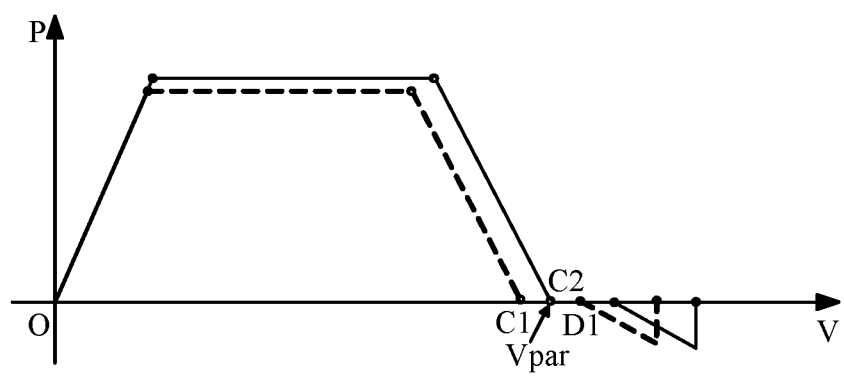
FIG. 12 shows an output PV characteristic curve of a DC/DC converter according to another embodiment of the present disclosure.

In the method for regulating output characteristics of the photovoltaic module according to the embodiment, each of photovoltaic modules is connected to one DC/DC converter, and output terminals of multiple DC/DC converters are connected in series to constitute a photovoltaic string. Multiple photovoltaic strings are connected in parallel. In a case that all DC/DC converters have the same output voltage, all DC/DC converters operate at a point C in a standby state of the photovoltaic power generation system, as shown in FIG. 4 to FIG. 8. In a case that the DC/DC converters have different output voltages, an operating point of the DC/DC converter having a small output voltage moves from the point C to a point D, and reaches a stable state between the point C and the point D, thereby suppressing the circulating current. As shown in FIG. 12, with taking a case that outputs of two DC/DC converters are connected in parallel as an example, an output characteristic curve of the DC/DC converter 1 having a small output voltage is represented as a dashed line, and an output characteristic curve of the DC/DC converter 2 having a large output voltage is represented as a solid line. After the outputs of the DC/DC converter 1 and the DC/DC converter 2 are connected in parallel, an output voltage of the DC/DC converter 1 moves from a voltage at a point C1 to a voltage at a point C2. The point C2 is located at a middle position of a section C1D1. In the point C2, the two DC/DC converters do not absorb or output a power, and there is no circulating current.

Due to the section CD where no power is outputted, the circulating current can be suppressed in a scenario such as different factory output characteristics of the DC/DC converters, different parameters of modules at an input terminal, different illumination, a part of failed DC/DC converters due to short circuit, strings with different number of DC/DC converters connected in parallel.

Figure 13:
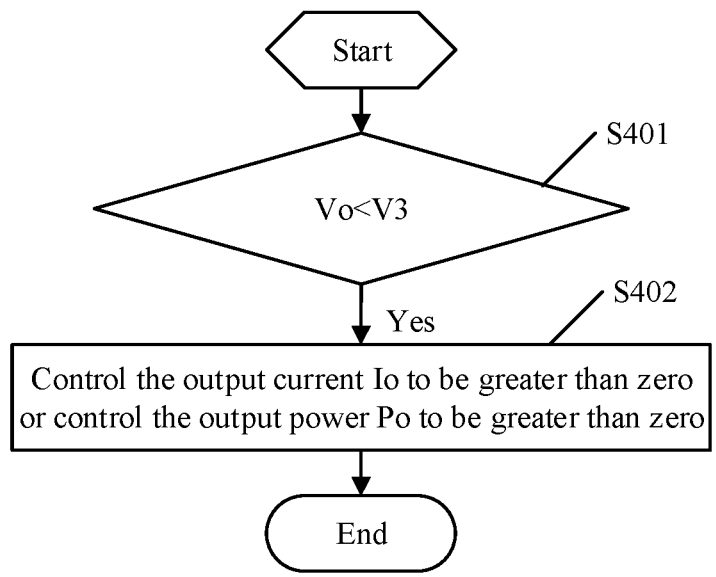
FIG. 13 is a flow diagram of a method for regulating output characteristics of a photovoltaic module according to another embodiment of the present disclosure.

Another method for regulating output characteristics of a photovoltaic module is further provided according to another embodiment of the present disclosure. Based on the above embodiment and FIG. 3, the method further includes steps S401 to S402 shown in FIG. 13.

In step S401, it is determined whether the output voltage Vo detected in a real-time manner is less than a third preset voltage threshold V3. The third preset voltage threshold V3 is less than the first preset voltage threshold V1.

Step S402 is performed in a case that the output voltage Vo is less than the third preset voltage threshold V3.

In step S402, the output current Io is controlled to be greater than zero, or the output power Po is controlled to be greater than zero.

In a preferred embodiment, in a case that the output voltage Vo is not greater than the third preset voltage threshold V3, the output current Io of the DC/DC converter is controlled to be not less than zero, or the output power Po of the DC/DC converter is controlled to be not less than zero, so that the DC/DC converter operates in a forward power outputting state in the first quadrant.

In a preferred embodiment, the third preset voltage threshold V3 is less than the first preset voltage threshold V1, to ensure that there is no overlapping region between the output characteristic curve of the DC/DC converter in the first quadrant and the output characteristic curve of the DC/DC converter in the fourth quadrant for the output voltage. That is, for any one output voltage Vo, there is not a case that two stable operating points exist in the output characteristic curve of the DC/DC converter respectively in the first quadrant and the fourth quadrant occurs.

In an embodiment, step S402 includes: controlling the DC/DC converter to perform maximum power point tracking on an output of the photovoltaic module connected with the DC/DC converter.

In a preferred embodiment, in a case that the output voltage Vo is not greater than the third preset voltage threshold V3, the DC/DC converter is controlled to perform maximum power point tracking on the photovoltaic module at an input terminal. A range of an output voltage in a case of maximum power point tracking (MPPT) is as shown by a section AB in FIG. 4 to FIG. 8. A normal photovoltaic module has a single maximum power point, as shown a point of intersection between the section AB in FIG. 4 to FIG. 8 and the output PV characteristic curve (dashed line) of the photovoltaic module. Therefore, in the embodiment, a range of a voltage within which a maximum power is outputted by the photovoltaic module may be extended greatly, and an effect of mismatch between parallel photovoltaic strings is reduced greatly.

In a practical application, an output voltage Vo at the point B may be equal to or not equal to an output voltage Vo at the point C. For example, the output voltage at the point B and the output voltage at the point C may be as shown in FIG. 4 to FIG. 8. In a case that the output voltage Vo is not greater than a fourth preset voltage threshold V4, the DC/DC converter is controlled to perform maximum power point tracking on the photovoltaic module at an input terminal, and a range of an output voltage in a case of MPPT is shown by a section AB in FIG. 4 to FIG. 8, FIG. 14 and FIG. 15. In a case that the output voltage Vo is less than the third preset voltage threshold V3 and is greater than the fourth preset voltage threshold V4, preferably, an output current Io is controlled to change in a range from a third preset current value to a second preset current threshold I2 according to a third monotone decreasing function with an independent variable of an output voltage Vo in at least a part of an output voltage interval, alternatively, an output power Po is controlled to change in a range from a third preset power value to a second preset power threshold P2 according to a fourth monotone decreasing function with an independent variable of an output voltage Vo in at least a part of an output voltage interval.

The third preset current value does not exceed fifty percent of a rated value of the output current, and may be zero. The third preset power value does not exceed fifty percent of a rated value of the output power, and may be zero.

As shown in FIG. 4 to FIG. 8, FIG. 14 and FIG. 15, the fourth preset voltage threshold V4 is less than the third preset voltage threshold V3.

In a preferred embodiment, in a case that the output voltage Vo is greater than V4 and less than V3, the output current Io of the DC/DC converter is limited to be not greater than the second preset current threshold I2, or the output power Po of the DC/DC converter is limited to be not greater than the second preset power threshold P2, so that the DC/DC converter operates with a low output power.

The second preset current threshold I2 and the second preset power threshold P2 are not negative.

In a preferred embodiment, the second preset current threshold I2 is decreased according to a third monotone decreasing function I2=f3(Vo), or the second preset power threshold P2 is decreased according to a fourth monotone decreasing function P2=f4(Vo), to gradually decrease an upper limit of the output power with an increase of the output voltage Vo. With taking an output PV characteristic curve as an example, the upper limit of the output power is decreased according to the monotone decreasing function, so that the output power of the DC/DC converter appears a small change trend with the increase of the output voltage, thereby reducing impact on other device, and further improving operation stability of the photovoltaic power generation system.

In an embodiment, the third monotone decreasing function $I2=f3(Vo)$ and the fourth monotone decreasing function $P2=f4(Vo)$ may be a linear function, a convex function, a concave function, a step function or a staircase function. Alternatively, the third monotone decreasing function $I2=f3(Vo)$ and the fourth monotone decreasing function $P2=f4(Vo)$ may also be a piecewise function, and each piece in the piecewise function may be represented as one of a linear function, a convex function, a concave function, a step function or a staircase function, which is not limited here and may depend on an application situation, and all fall within the protection scope of the present disclosure.

In an embodiment, as shown by a section BC in FIG. 4 to FIG. 8, the upper limit of the output power of the DC/DC converter is decreased according to a linear function with the increase of the output voltage, to implement smooth decrease of the power.

Figure 14:
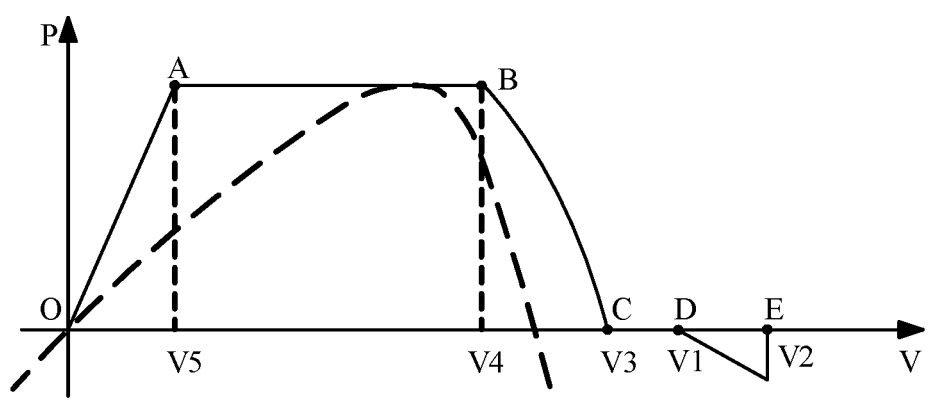
FIG. 14 shows an output PV characteristic curve of a DC/DC converter according to another embodiment of the present disclosure.

In a preferred embodiment, as shown by a section BC in FIG. 14, the upper limit of the output power of the DC/DC converter is decreased according to a convex function with the increase of the output voltage, a decreasing speed of the upper limit of the output power is increased with a decrease of a distance to the point C, to simulate a curve part of the output PV characteristic curve of the photovoltaic module at the right side of the maximum power point.

Figure 15:
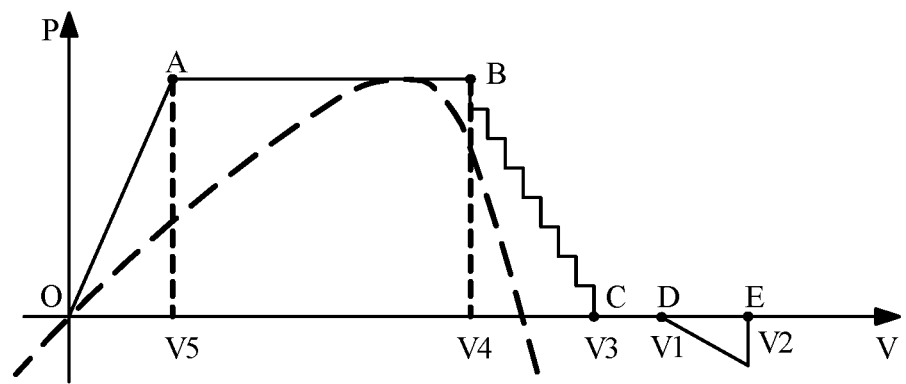
FIG. 15 shows an output PV characteristic curve of a DC/DC converter according to another embodiment of the present disclosure.

In another preferred embodiment, as shown by the section BC in FIG. 15, the upper limit of the output power of the DC/DC converter is decreased according to a staircase function with the increase of the output voltage. In this case, the method may be implemented by a segmented table lookup manner in a digital control system, which avoids function operation.

In addition, in a case of $Vo=V3$, $I2=f3(Vo)=0$ and $P2=f4(Vo)=0$, to implement smooth transition of the DC/DC converter in vicinity of the point C.

In a practical application, step S402 may further include: in a case that the output voltage Vo is less than a fifth preset voltage threshold V5 and greater than zero, controlling the output current Io to change in a range from a fourth preset current value to a third preset current threshold (which may be equal to the second preset current threshold I2) according to a first monotone increasing function with an independent variable of the output voltage Vo in at least a part of an output voltage interval, or controlling the output power Po to change in a range from a fourth preset power value to a third preset power threshold (which may be equal to the second preset power threshold P2) according to a second monotone increasing function with an independent variable of the output voltage Vo in at least a part of an output voltage interval.

As shown in FIG. 4 to FIG. 8, FIG. 14 and FIG. 15, the fifth preset voltage threshold V5 is less than the fourth preset voltage threshold V4.

In a preferred embodiment, in a case that the output voltage Vo is not greater than the fifth preset voltage threshold V5, the output current Io of the DC/DC converter is limited to be not greater than the third preset current threshold I3 (which is preferably equal to the second preset current threshold I2), or the output power Po of the DC/DC converter is limited to be not greater than the third preset power threshold P3 (which is preferably equal to the second preset power threshold P2). The third preset current threshold and the third preset power threshold are not negative. The output current or the output power is limited in a case of low output voltage, to effectively protect the DC/DC converter from being damaged due to overcurrent.

In a preferred embodiment, the third preset current threshold I3 is increased according to the first monotone increasing function $I3=f5(Vo)$, or the third preset power threshold P3 is increased according to the second monotone increasing function $P3=f6(Vo)$, to gradually improve the upper limit of the output power with the increase of Vo. With taking the output PV characteristic curve as an example, the upper limit of the output power is increased based on the monotone increasing function, so that the output power of the DC/DC converter appears a small change trend with the increase of the output voltage, thereby reducing impact to other device, and further improving operation stability of the photovoltaic power generation system.

Preferably, in a case of the output voltage $Vo=0$, $I3=f5(Vo)=0$ and $P3=f6(Vo)=0$.

Preferably, the first monotone increasing function $I3=f5(Vo)$ and the second monotone increasing function $P3=f6(Vo)$ may be a linear function, a convex function, a concave function, a step function or a staircase function. Alternatively, the first monotone increasing function $I3=f5(Vo)$ and the second monotone increasing function $P3=f6(Vo)$ may also be a piecewise function, and each piece in the piecewise function may be represented as one of a linear function, a convex function, a concave function, a step function or a staircase function, which is not limited here and may depend on an application situation, and all fall within the protection scope of the present disclosure.

Figure 16:
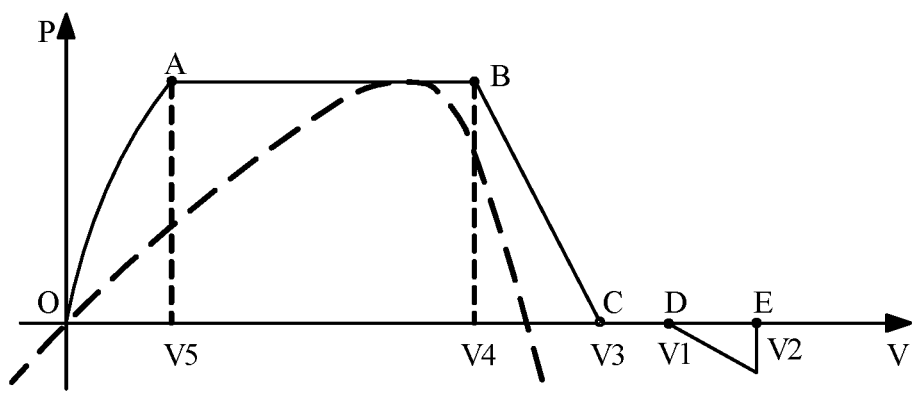
FIG. 16 shows an output PV characteristic curve of a DC/DC converter according to another embodiment of the present disclosure.
Figure 17:
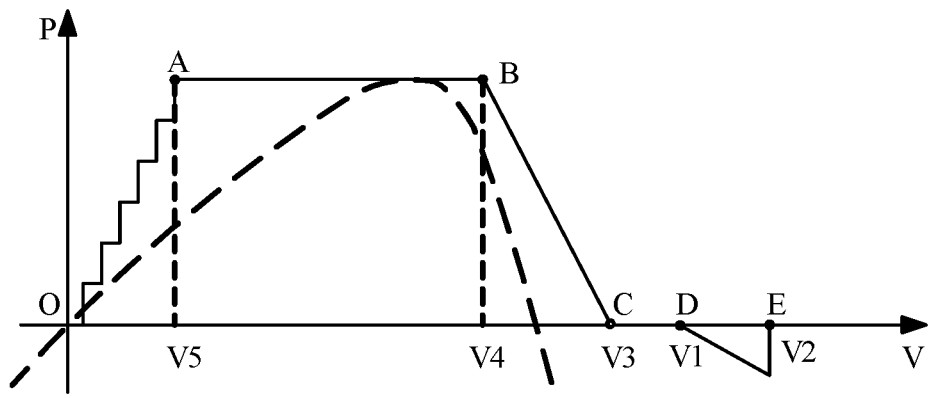
FIG. 17 shows an output PV characteristic curve of a DC/DC converter according to another embodiment of the present disclosure.

The monotone increasing function is a linear function in FIG. 4 to FIG. 8, FIG. 14 and FIG. 15, and the monotone increasing function is a convex function in FIG. 16, and the monotone increasing function is a staircase function in FIG. 17.

With taking the second monotone increasing function $P3=f6(Vo)$ as an example, as shown by a section OA in FIG. 16, an upper limit of the output power of the DC/DC converter is increased according to a convex function with an increase of the output voltage, and an increasing speed of the upper limit of the output power is reduced with a decrease of a distance to the point A, to simulate a curve part of the output PV characteristic curve of the photovoltaic module at the left side of the maximum power point.

With taking the second monotone increasing function $P3=f6(Vo)$ as an example, as shown by a section OA in FIG. 17, the upper limit of the output power of the DC/DC converter is increased according to a staircase function with an increase of the output voltage. In this case, the method may be implemented by a segmented table lookup manner in a digital control system, which avoids function calculation.

The first monotone increasing function $I3=f5(Vo)$ is set in a similar manner as described above, and is not described repeatedly here anymore.

Another method for regulating output characteristics of a photovoltaic module is further provided according to another embodiment of the present disclosure. Based on the above embodiment and FIG. 13, the method further includes controlling the third preset voltage threshold V3 to change in at least one continuous time period according to a third monotone increasing function with an independent variable of time, during a startup of the DC/DC converter.

In a preferred embodiment, the DC/DC converter gradually increases the third preset voltage threshold V3 according to the third monotone increasing function $V3=f7(t)$ during a startup. The independent variable t denotes time.

Figure 18:
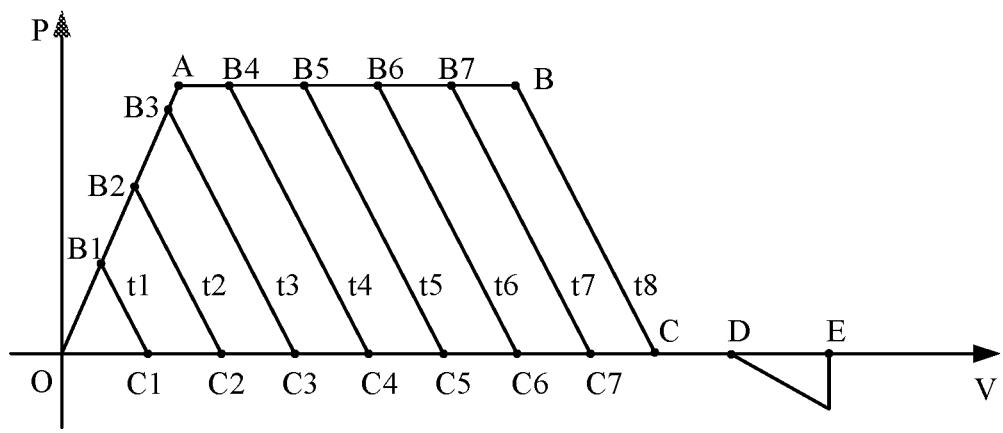
FIG. 18 shows an output PV characteristic curve of a DC/DC converter according to another embodiment of the present disclosure.

As shown in FIG. 18, when the DC/DC converter begins to startup, the third preset voltage threshold V3 is increased gradually from a value at a point C1 to a value at a point C7, and then reaches a value at a point C, and the fourth preset voltage threshold V4 is increased from a value at a point B1 to a value at a point B7, and reaches a value at a point B, within a time period from t1 to t8. In this way, the output voltage of the DC/DC converter may be increased slowly within a time period, to reduce impact on other device in the photovoltaic power generation system, and facilitate reliable operation of the photovoltaic power generation system.

Other operation principles are the same as those in the above embodiments, and are not described repeatedly here anymore.

It should be illustrated that implementations in the embodiments of the present disclosure may be combined. For example, as shown in FIG. 17, the staircase function and the linear function are adopted for the section OA and the section BC, respectively. A section may also be divided into multiple sub sections, and different functions are adopted for the sub sections, as long as it can be ensured that an overall change trend conforms to a predetermined decreasing trend or a predetermined increasing trend, which are not described repeatedly here anymore, and all fall within the protection scope of the present disclosure.

A DC/DC converter is further provided according to another embodiment of the present disclosure, which includes a main circuit and a control unit. An input terminal of the main circuit is connected with at least one photovoltaic module. An output terminal of the main circuit has an output voltage of Vo, and is connected with an output terminal of a main circuit of other DC/DC converter in series. A control terminal of the main circuit is connected with an output terminal of the control unit. The control unit includes a processing module and a storage module. The processing module is configured to execute multiple instructions stored in the storage module to perform the method for regulating output characteristics of the photovoltaic module according to any one embodiment described above.

Figure 19:
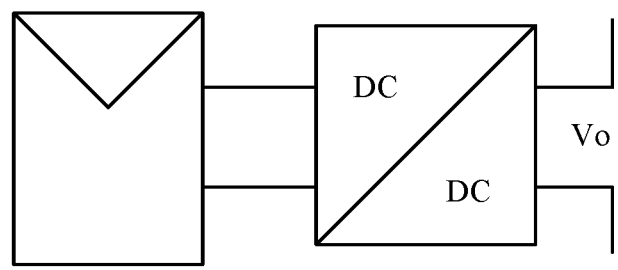
FIG. 19 is a schematic diagram showing a connection relation of a DC/DC converter according to another embodiment of the present disclosure.

With reference to FIG. 19, the input terminal of the DC/DC converter is connected with at least one photovoltaic module (a case that the input terminal of the DC/DC converter is connected with one photovoltaic module is taken as an example shown in FIG. 19). The DC/DC converter regulates an output current or an output power based on the output voltage Vo and a preset output characteristic curve. The DC/DC converter has a step-up and step-down function, and further includes a control unit configured to implement the method for regulating output characteristics of a photovoltaic module described above.

In the photovoltaic power generation system, the DC/DC converter may also referred to as a power optimizer. In the photovoltaic power generation system, output terminals of multiple DC/DC converters are connected in series to constitute a photovoltaic string, to acquire a high direct-current voltage.

Figure 20:
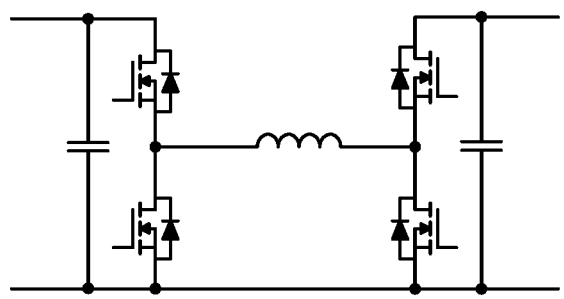
FIG. 20 is a schematic structural diagram of a main circuit in the DC/DC converter according to another embodiment of the present disclosure.

Preferably, with reference to FIG. 20, the main circuit is a bidirectional symmetric Buck-boost topology circuit.

Preferably, the method for regulating output characteristics of the photovoltaic module is implemented in an output voltage Vo closed-loop control manner, or is implemented in a double closed-loop control manner including an outer loop of input voltage and an inner loop of current.

It can be known that, in the present disclosure, the output PV characteristic curve or the output IV characteristic curve of the DC/DC converter may be regulated based on the output voltage Vo in a closed-loop control system. For example, the output PV characteristic curve or the output IV characteristic curve of the DC/DC converter is implemented based on the output voltage Vo in an output voltage closed-loop control manner, or a double closed-loop system including an outer loop of input voltage and an inner loop of current. Power limitation or current limitation can be implemented by applying an amplitude limiting for the closed-loop output, which is not described in detail here anymore.

Other operation principles are the same as those in the above embodiments, and are not described repeatedly here anymore.

The embodiments of the present disclosure are described in a progressive manner, and each embodiment is focused on describing difference from other embodiments, and reference may be made one to another for the same or similar parts among the embodiments. Since the device disclosed in the embodiment corresponds to the method disclosed in the embodiment, the description for the device is simple, and reference may be made to the method in the embodiment for the relevant parts.

Only preferred embodiments of the present disclosure are described above, and are not intended to limit the present disclosure in any way. The present disclosure is described as the preferred embodiment above, which should not be intended to limit the present disclosure. Numerous possible alternations, modifications, and equivalents can be made to the technical solutions of the present disclosure by those skilled in the art in light of the methods and technical content disclosed above without deviating from the scope of the technical solution of the present disclosure. Therefore, any alternations, modifications and equivalents made to the embodiments above according to the technical essential of the present disclosure without deviating from the technical solution of the present disclosure should fall within the protection scope of the present disclosure.

The invention claimed is:

1. A method for regulating output characteristics of a photovoltaic module, the method being applied to a direct current/direct current (DC/DC) converter connected with the photovoltaic module, and the method comprising:
   determining whether an output voltage of the DC/DC converter detected in a real-time manner is greater than a first preset voltage threshold;
   controlling an output current of the DC/DC converter to be greater than a first preset current threshold and less than zero or controlling an output power of the DC/DC converter to be greater than a first preset power threshold and less than zero, in a case that the output voltage is greater than the first preset voltage threshold;
   determining whether the output voltage detected in a real-time manner is less than a third preset voltage threshold, wherein the third preset voltage threshold is less than the first preset voltage threshold; and
   controlling the output current to be greater than zero or controlling the output power to be greater than zero, in a case that the output voltage is less than the third preset voltage threshold.

2. The method for regulating output characteristics of a photovoltaic module according to claim 1, further comprising:
   determining whether the output voltage detected in a real-time manner is greater than a second preset voltage threshold, wherein the second preset voltage threshold is greater than the first preset voltage threshold; and controlling the DC/DC converter to enter a protection mode in a case that the output voltage is greater than the second preset voltage threshold.

3. The method for regulating output characteristics of a photovoltaic module according to claim 1,
wherein the controlling an output current of the DC/DC converter to be greater than a first preset current threshold and less than zero comprises: controlling the output current to change in a range from the first preset current threshold to a first preset current value, according to a first monotone decreasing function with an independent variable of the output voltage, in at least a part of an output voltage interval,
wherein the controlling an output power of the DC/DC converter to be greater than a first preset power threshold and less than zero comprises: controlling the output power to change in a range from the first preset power threshold to a first preset power value, according to a second monotone decreasing function with an independent variable of the output voltage, in at least a part of an output voltage interval, and
wherein the first preset current value does not exceed fifty percent of a rated value of the output current, and the first preset power value does not exceed fifty percent of a rated value of the output power.

4. The method for regulating output characteristics of a photovoltaic module according to claim 1, further comprising:
determining whether the output voltage detected in a real-time manner is greater than or equal to a third preset voltage threshold and less than or equal to the first preset voltage threshold, wherein the third preset voltage threshold is less than the first preset voltage threshold; and
controlling an absolute value of the output current to be not greater than a second preset current value or controlling an absolute value of the output power to be not greater than a second preset power value, in a case that the output voltage is greater than or equal to the third preset voltage threshold and less than or equal to the first preset voltage threshold.

5. The method for regulating output characteristics of a photovoltaic module according to claim 1, wherein the controlling the output current to be greater than zero or the controlling the output power to be greater than zero comprises:
controlling the DC/DC converter to perform maximum power point tracking on an output of the photovoltaic module connected with the DC/DC converter.

6. The method for regulating output characteristics of a photovoltaic module according to claim 1, wherein the controlling the output current to be greater than zero or the controlling the output power to be greater than zero comprises:
in a case that the output voltage is less than the third preset voltage threshold and greater than a fourth preset voltage threshold, controlling the output current to change in a range from a third preset current value to a second preset current threshold according to a third monotone decreasing function with an independent variable of the output voltage in at least a part of an output voltage interval or controlling the output power to change in a range from a third preset power value to a second preset power threshold according to a fourth monotone decreasing function with an independent variable of the output voltage in at least a part of an output voltage interval,
wherein the fourth preset voltage threshold is less than the third preset voltage threshold, and wherein the third preset current value does not exceed fifty percent of a rated value of the output current, and the third preset power value does not exceed fifty percent of a rated value of the output power.

7. The method for regulating output characteristics of a photovoltaic module according to claim 1, wherein the controlling the output current to be greater than zero or the controlling the output power to be greater than zero comprises:
in a case that the output voltage is less than a fifth preset voltage threshold and greater than zero, controlling the output current to change in a range from a fourth preset current value to a third preset current threshold according to a first monotone increasing function with an independent variable of the output voltage in at least a part of an output voltage interval or controlling the output power to change in a range from a fourth preset power value to a third preset power threshold according to a second monotone increasing function with an independent variable of the output voltage in at least a part of an output voltage interval,
wherein the fifth preset voltage threshold is less than a fourth preset voltage threshold.

8. The method for regulating output characteristics of a photovoltaic module according to claim 1, further comprising:
controlling the third preset voltage threshold to change in at least one continuous time period according to a third monotone increasing function with an independent variable of time, in a startup phase of the DC/DC converter.

9. The method for regulating output characteristics of a photovoltaic module according to claim 5, further comprising:
controlling the third preset voltage threshold to change in at least one continuous time period according to a third monotone increasing function with an independent variable of time, in a startup phase of the DC/DC converter.

10. The method for regulating output characteristics of a photovoltaic module according to claim 6, further comprising:
controlling the third preset voltage threshold to change in at least one continuous time period according to a third monotone increasing function with an independent variable of time, in a startup phase of the DC/DC converter.

11. The method for regulating output characteristics of a photovoltaic module according to claim 7, further comprising:
controlling the third preset voltage threshold to change in at least one continuous time period according to a third monotone increasing function with an independent variable of time, in a startup phase of the DC/DC converter.

12. A direct current/direct current (DC/DC) converter, comprising:
a main circuit; and
a control unit,
wherein an input terminal of the main circuit is connected with at least one photovoltaic module;
an output terminal of the main circuit is connected with an output terminal of a main circuit in other DC/DC converter in series;

a control terminal of the main circuit is connected with an output terminal of the control unit;

wherein the control unit comprises a processing module and a storage module;

the processing module is configure to execute a plurality of instructions stored in the storage module to perform a method for regulating output characteristics of a photovoltaic module, wherein the method comprises:

determining whether an output voltage of the DC/DC converter detected in a real-time manner is greater than a first preset voltage threshold;

controlling an output current of the DC/DC converter to be greater than a first preset current threshold and less than zero or controlling an output power of the DC/DC converter to be greater than a first preset power threshold and less than zero, in a case that the output voltage is greater than the first preset voltage threshold;

determining whether the output voltage detected in a real-time manner is less than a third preset voltage threshold, wherein the third preset voltage threshold is less than the first preset voltage threshold; and controlling the output current to be greater than zero or controlling the output power to be greater than zero, in a case that the output voltage is less than the third preset voltage threshold.

13. The DC/DC converter according to claim 12, wherein the main circuit is a bidirectional symmetric Buck-boost topology circuit.

14. The DC/DC converter according to claim 12, wherein the method for regulating output characteristics of the photovoltaic module is implemented in an output voltage closed-loop control manner, or a double closed-loop control manner comprising an outer loop of input voltage and an inner loop of current.

* * * * *